(12) United States Patent
Kaneda et al.

(10) Patent No.: US 8,314,167 B2
(45) Date of Patent: Nov. 20, 2012

(54) FLAME-RETARDANT THERMOPLASTIC RESIN COMPOSITION

(75) Inventors: Takayoshi Kaneda, Saitama (JP); Akihiro Yamaki, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 12/996,129

(22) PCT Filed: Jun. 2, 2009

(86) PCT No.: PCT/JP2009/002452
§ 371 (c)(1),
(2), (4) Date: Dec. 3, 2010

(87) PCT Pub. No.: WO2009/147830
PCT Pub. Date: Dec. 10, 2009

(65) Prior Publication Data
US 2011/0082241 A1 Apr. 7, 2011

(30) Foreign Application Priority Data
Jun. 6, 2008 (JP) .................................. 2008-149348

(51) Int. Cl.
C08K 5/3492 (2006.01)
(52) U.S. Cl. ...................................................... 524/100
(58) Field of Classification Search .................... 524/100
See application file for complete search history.

(56) References Cited

U.S. PATENT DOCUMENTS

| | | | |
|---|---|---|---|
| 6,608,256 B2 * | 8/2003 | Suzuki et al. | 174/117 F |
| 7,465,761 B2 | 12/2008 | Murase et al. | |
| 2003/0088000 A1 | 5/2003 | Kimura et al. | |
| 2004/0254270 A1 * | 12/2004 | Harashina | 524/86 |
| 2005/0256234 A1 | 11/2005 | Kurumatani et al. | |
| 2011/0092622 A1 * | 4/2011 | Kaneda et al. | 524/100 |

FOREIGN PATENT DOCUMENTS

| | | |
|---|---|---|
| EP | 0 661 342 | 7/1995 |
| EP | 1 466 946 | 10/2004 |
| EP | 1 719 800 | 11/2006 |
| JP | 2003-26935 A | 1/2003 |
| JP | 2004-137316 A | 5/2004 |
| JP | 2004-238568 A | 8/2004 |
| JP | 2006-348228 A | 12/2006 |
| WO | WO 2004/000973 A1 | 12/2003 |
| WO | WO 2005/080494 A1 | 9/2005 |

OTHER PUBLICATIONS

International Search Report of PCT/JP2009/002452 (Jul. 14, 2009).
Supplementary European Search Report for EP-09 75 8097 dated Nov. 11, 2011.

* cited by examiner

*Primary Examiner* — Peter Szekely
(74) *Attorney, Agent, or Firm* — Millen, White, Zelano & Branigan, P.C.

(57) ABSTRACT

The present invention is a flame-retardant thermoplastic resin composition characterized by combining (A) (poly) phosphate compound represented by the following general formula (1), (B) (poly) phosphate compound represented by the following general formula (3) and (C) polycarbodiimide described in claim 1.

n in the formula (1) is a number of 1~100, $X^1$ is a triazine derivative represented by the following general formula (2) and P is a number satisfying a relational formula $0 < p \leq n+2$. $Z^1$ and $Z^2$ in the formula (2) are groups selected from a $-NR^5R^6$ group [herein, $R^5$ and $R^6$ are a hydrogen atom, an alkyl group having 1~6 carbon atoms or a methylol group], a hydroxyl group, a mercapto group, an alkyl group having 1~10 carbon atoms, an alkoxy group having 1~10 carbon atoms, a phenyl group or a vinyl group. r in the general formula (3) is a number of 1~100, $Y^1$ is a diamine containing $[R^1R^2N(CH_2)_mNR^3R^4]$, piperazine or a diamine containing a piperazine ring. $R^1$, $R^2$, $R^3$ and $R^4$ are each a hydrogen atom, or an alkyl group having 1~5 carbon atoms, m is an integer of 1~10, q is a number satisfying a relational formula $0 < q \leq r+2$.

16 Claims, No Drawings

FLAME-RETARDANT THERMOPLASTIC RESIN COMPOSITION

TECHNICAL FIELD

The present invention relates to flame-retardant thermoplastic resin composition, in particular to a flame-retardant thermoplastic resin composition having improved flame retardancy as well as good water resistance and workability and to molded articles such as electric cable, automobile interior material, building material and electric parts using the same.

BACKGROUND OF THE INVENTION

Taking advantages of superiorities in sanitary properties, workability, chemical resistance, weather resistance, electric characteristics and mechanical strength etc., thermoplastic resin has been commonly used for various fields such as buildings, interior decorations and automobile parts as well as fields of electric products for industries and homes, and application use of the thermoplastic resin has been enlarged. Because of such enlargement of application use, flame retardancy began to be requested for thermoplastic resin, and performance requirements are getting more rigorous year after year. Recently in particular, flame retardants such as halogen-containing compound alone or a combination of it with an antimony compound such as antimony oxide have been added to the thermoplastic resin to produce flame-retardant thermoplastic resin composition, which has been a mainstream of the conventional flame-retarding technique. However, it has a defect that the halogenated gases are generated when the flame-retardant resin compositions are burned or molded. Therefore, flame-retardant resin composition, which does not generate the halogenated gases when burned or molded is required.

In order to meet these needs, a method was proposed wherein a specific metallic hydrate, which can inhibit resin burning by performing an endothermal reaction to cause decomposition and dehydration reactions at the burning temperature of resin, was combined as an inorganic flame retardant. However, the metallic hydrate used for this method has only extremely slight flame retardancy. Therefore, it is necessary to combine a large amount of this metallic hydrate in order to produce a flame-retardant effect. In the result, problems occur wherein molding workability of flame-retardant resin composition obtained becomes poor and mechanical strength of molded material obtained decreases.

Recently, in order to meet the above needs, methods using specific phosphorus compounds are proposed which are fire prevention materials by combining ethylenediamine phosphate with salts of melamine and/or cyanuric acid derivatives (such as phosphoric acid melamine) (Patent document 1) and flame-retardant thermoplastic resin compositions which contain phosphates such as phosphoric acid alkyldiamine as a flame retardant (Patent document 2).

However, the above ethylenediamine phosphate and phosphoric acid alkyldiamine have high water-solubility. Therefore, fire prevention materials or flame-retardant thermoplastic resin compositions containing them have poor water resistance and can not be used for the use wherein a contact with water is unavoidable, which was a disadvantage.

Furthermore, an intumescent flame retardant is disclosed which exhibits flame retardancy by forming a surface intumescent layer that can inhibit diffusion of decomposition products produced and heat transmission when burned (Patent document 3). However, although this flame retardant has excellent flame retardancy, it has a disadvantage where it is insufficient in water resistance.

A system wherein an ammonium polyphosphate compound and phosphoric acid amine salt are used together to provide a thermosetting resin on the surface of the ammonium polyphosphate compound is disclosed and polycarbodiimide is described as an example of the above thermosetting resin (Patent document 4). However, in this case, water resistance is insufficient and in addition there is no mention that an improvement in the workability of thermoplastic resin is obtained.

Prior Art Document

Patent Document

Patent document 1: Japanese Unexamined Patent Publication Tokkaisho 59-47285

Patent document 2: Japanese Unexamined Patent Publication Tokuhyo-hey 5-508187

Patent document 3: Japanese Unexamined Patent Publication Tokkai 2003-26935

Patent document 4: Japanese Unexamined Patent Publication Tokkai-hei 9-235407

SUMMARY OF THE INVENTION

Problems to be Solved by the Invention

Therefore, the first object of the present invention is to provide a thermoplastic resin composition having excellent flame retardancy, water resistance, workability and molding properties.

The second object of the present invention is to provide a molded article having excellent flame retardancy and water resistance.

Means to Solve the Problem

The inventors of the present invention have studied extensively in order to achieve the above objects. As a result of this, they have found that by using plural specific (poly) phosphate compounds with polycarbodiimide, the extremely excellent results are obtained, and the present invention was completed.

Namely, the present inventions are a flame-retardant thermoplastic resin composition characterized by that it is obtained by mixing the following components (A), (B) and (C) with thermoplastic resin, and a molded article characterized by that it is obtained by using said flame retardant thermoplastic resin composition.

Component (A): a (poly) phosphate compound represented by the following general formula (1).

Component (B): a (poly) phosphate compound represented by the following general formula (3).

Component (C): polycarbodiimide

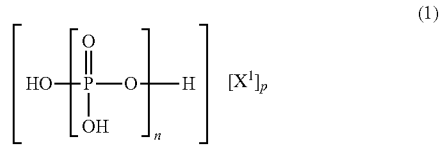

n in the formula (1) is a number of 1~100, $X^1$ is a triazine derivative represented by the following general formula (2) and P is a number satisfying a relational formula $0 < p \leq n+2$.

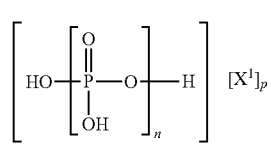

(1)

n in the formula (1) is a number of 1~100, $X^1$ is a triazine derivative represented by the following general formula (2), P is a number satisfying a relational formula $0<p\leqq n+2$.

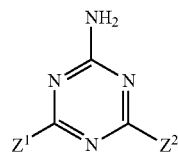

(2)

$Z^1$ and $Z^2$ in the formula (2) may be identical or different and are groups selected from a group consisting of a —$NR^5R^6$ group [herein, $R^5$ and $R^6$ are each a hydrogen atom, a straight chain or branched alkyl group having 1~6 carbon atoms or a methylol group independently], a hydroxyl group, a mercapto group, a straight chain or branched alkyl group having 1~10 carbon atoms, a straight chain or branched alkoxy group having 1~10 carbon atoms, a phenyl group and a vinyl group.

Specific examples of a straight chain or branched alkyl group having 1~10 carbon atoms represented by $Z^1$ and $Z^2$ in the above general formula (2) are methyl, ethyl, propyl, isopropyl, butyl, secondary butyl, tert-butyl, isobutyl, amyl, isoamyl, tert-amyl, hexyl, cyclohexyl, heptyl, isoheptyl, tert-heptyl, n-octyl, isooctyl, tert-octyl, 2-ethylhexyl, nonyl and decyl. Examples of a straight chain or branched alkoxy group having 1~10 carbon atoms are groups derived from these alkyl groups.

Specific examples of the above triazine derivative are melamine, acetoguanamine, benzoguanamine, acrylguanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine and 2-amino-4,6-dimercapto-1,3,5-triazine.

It is preferable to use a salt of phosphoric acid and melamine as a (poly) phosphate compound represented by the above general formula (1) used as the component (A) in the present invention. Specific examples are melamine orthophosphate, melamine pyrophosphate and melamine polyphosphate. In the present invention, it is preferable in particular to use melamine pyrophosphate among these which corresponds to a compound of the above general formula (1) wherein n is 2, p is 2 and $X^1$ is melamine.

The salt of phosphoric acid and melamine such as melamine pyrophosphate used in the present invention can be obtained as follows; after blending sodium pyrophosphate and melamine at the suitable reaction ratio, hydrochloric acid is added to react and neutralization is carried out by sodium hydroxide.

The (poly) phosphate compound represented by the following general formula (3) used as the component (B) in the present invention is a salt of phosphoric acid and diamine or piperazine.

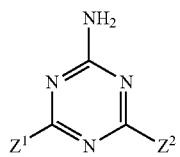

(2)

$Z^1$ and $Z^2$ in the formula (2) may be identical or different and are groups selected from a group consisting of a —$NR^5R^6$ group [herein, $R^5$ and $R^6$ are each a hydrogen atom, a straight chain or branched alkyl group having 1~6 carbon atoms, or a methylol group independently], a hydroxyl group, a mercapto group, a straight chain or branched alkyl groups having 1~10 carbon atoms, a straight chain or branched alkoxy group having 1~10 carbon atoms, a phenyl group and a vinyl group, independently.

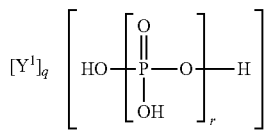

(3)

r in the formula (3) is a number of 1~100, $Y^1$ is a diamine containing $[R^1R^2N(CH_2)_mNR^3R^4]$, piperazine, or a diamine containing a piperazine ring. $R^1$, $R^2$, $R^3$ and $R^4$ are each a hydrogen atom, or a straight chain or branched alkyl group having 1~5 carbon atoms independently, m is an integer of 1~10, q is a number satisfying a relational formula $0<q\leqq r+2$.

It is preferable that the flame-retardant thermoplastic resin composition of the present invention contains zinc oxide as a component (D). It is preferable as the above component (A) to use melamine pyrophosphate which corresponds to a compound of the general formula (1) wherein n is 2, p is 2 and $X^1$ is a melamine ($Z^1$ and $Z^2$ in the general formula (2) are —$NH_2$). It is preferable as the above component (B) to use piperazine polyphosphate which corresponds to a compound of the general formula (3) wherein q is 1, $Y^1$ is a piperazine. It is preferable in particular to use piperazine pyrophosphate as the above piperazine polyphosphate.

EFFECT OF THE INVENTION

The thermoplastic resin composition of the present invention has excellent workability and molding properties as well as excellent flame retardancy and water resistance. Therefore, it can provide easily molded articles having flame retardancy and water resistance.

BEST MODES FOR CARRYING OUT THE INVENTION

The (poly) phosphate compound, which is used as the component (A) in the flame-retardant thermoplastic resin composition of the present invention, represented by the following general formula (1) is a salt of phosphoric acid and a triazine derivative.

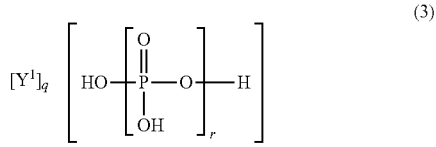

In the formula (3), r is a number of 1~100, $Y^1$ is a diamine containing $[R^1R^2N(CH_2)_mNR^3R^4]$, piperazine, or a diamine containing a piperazine ring. $R^1$, $R^2$, $R^3$ and $R^4$ are each a hydrogen atom, or a straight chain or branched alkyl group having 1~5 carbon atoms, m is an integer of 1~10, q is a number satisfying $0<q\leq r+2$, independently.

Specific examples of diamine represented by $Y^1$ in the above general formula (3) are N,N,N',N'-tetramethyldiaminomethane, ethylenediamine, N, N'-dimethylethylenediamine, N, N'-diethylethylenediamine, N, N-dimethylethylenediamine, N, N-diethylethylenediamine, N, N, N', N'-tetramethylethylenediamine, N,N,N',N'-tetraethylethylenediamine, tetramethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, 1,10-diaminodecane, piperazine, trans-2,5-dimethylpiperazine, 1,4-bis(2-aminoethyl)piperazine and 1,4-bis(3-aminopropyl)piperazine.

In the present invention, it is preferable to use a salt of phosphoric acid and piperazine as a (poly) phosphate compound represented by the afore-mentioned general formula (3) used as the component (B). Specific examples are piperazine orthophosphate, piperazine pyrophosphate and piperazine polyphosphate. In the present invention, it is preferable to use piperazine polyphosphate among these, which corresponds to a compound of the afore-mentioned general formula (3) wherein q is 1, $Y^1$ is piperazine. It is preferable in particular to use piperazine pyrophosphate.

The salt of phosphoric acid and piperazine used in the present invention can be obtained easily as a precipitate having low-water solubility by reacting piperazine and pyrophosphoric acid in water or methanol aqueous solution. Piperazine polyphosphate may be a salt obtained from piperazine and polyphosphoric acid which consists of a mixture of orthophosphoric acid, pyrophosphoric acid, tripolyphosphoric acid and other polyphosphate. Thus, the composition of polyphosphoric acid of law material is not limited in particular.

It is preferable that the blending amount of the above component (A) in the present invention is 0.1~40 mass parts, in particular 1~30 mass parts relative to 100 mass parts of thermoplastic resin. On the other hand, it is preferable that the blending amount of the above component (B) is 0.1~50 mass parts, in particular 1~40 mass parts relative to 100 mass parts of thermoplastic resin.

It is preferable that the total blending amount of the above components (A) and (B) is 1~90 mass parts, in particular 5~70 mass parts relative to 100 mass parts of thermoplastic resin component. If it is under 1 mass parts, sufficient flame-retardant properties cannot be obtained. If it is beyond 90 mass parts, the qualities as a resin decrease, which is not preferable.

It is preferable that the blending ratio of (A)/(B)(mass standard) of the above components (A) and (B) is 20/80~50/50, in particular 30/70~50/50.

The polycarbodiimide used as the component (C) in the present invention is a (co) polymer obtained by using at least one kind of compound selected from the following polyisocyanate compound. Specific examples of the above polyisocyanate are hexamethylenediisocyanate, xylenediisocyanate, cyclohexanediisocyanate, pyridinediisocyanate, 2,4-trilenediisocyanate, 2,6-trilenediisocyanate, 4,4-diphenylmethanediisocyanate, p-phenylenediisocyanate, m-phenylenediisocyanate and 1,5-naphthylenediisocyanate.

CARBODILITE HMV-8CA and CARBODILITE LA-1 manufactured by Nisshinbo Chemical Inc. are preferable from viewpoints of water resistance and workability as polycarbodiimide of the above component (C). In cases where these polycarbodiimides are used, the surface appearance of the strand is good, which improves workability, when resin is prepared by extrusion.

It is preferable that the blending amount of the above component (C) is 0.01~10 mass parts, in particular 0.1~5 mass parts, optimally 0.5~3 mass parts relative to 100 mass parts of thermoplastic resin from the viewpoints of water resistance and workability. If it is under 0.01 mass parts, water resistance and workability tend to be insufficient. If it is beyond 10 mass parts, the resin quality tends to decrease.

It is preferable in the present invention that zinc oxide is additionally blended as a component (D). The zinc oxide may be surface-treated. In the present invention, store-bought products such as Zinc Oxide Grade 1 (manufactured by MITSUI MINING & SMELTING CO., LTD.), Partially Coated Type Zinc Oxide (manufactured by MITSUI MINING & SMELTING CO., LTD.), NANOFINE 50 (ultrafine particle zinc oxide having average particle diameter of 0.02 μm: manufactured by SAKAI CHEMICAL INDUSTRY CO., LTD.), NANOFINE K (ultrafine particle zinc oxide having average particle diameter of 0.02 μm coated with zinc silicate: manufactured by SAKAI CHEMICAL INDUSTRY CO., LTD.) can be used.

It is preferable in the present invention that the blending amount of zinc oxide used as the component (D) is 0.01~10 mass parts, in particular 0.1~5 mass parts relative to 100 mass parts of thermoplastic resin.

When the flame-retardant thermoplastic resin composition of the present invention is manufactured, the timing of blending the components (A)~(D) with the thermoplastic resin is not limited in particular. Two or more kinds selected from the components (A)~(D) may be put together into one pack in advance to blend with the thermoplastic resin. Each component may be suitably blended with the thermoplastic resin. When they are put together into one pack, each component may be crushed respectively to blend, or may be crushed after blended.

Fluorinated drip inhibitor may be blended with the flame-retardant thermoplastic resin composition of the present invention. When fluorinated drip inhibitor is blended, melt flow rate (MFR) of resin tends to decrease frequently, so care should be taken.

Specific examples of fluorinated drip inhibitors available for the present invention are fluorinated resins such as polytetrafluoroethylene, polyvinylidene fluoride and polyhexafluoropropylene; perfluoroalkane sulfonic acid alkali metal salt compounds such as perfluoromethane sulfonic acid sodium salt, perfluoro-n-butane sulfonic acid potassium salt, perfluoro-t-butane sulfonic acid potassium salt, perfluorooctane sulfonic acid sodium salt and perfluoro 2-ethylhexane sulfonic acid calcium salt; or perfluoroalkane sulfonic acid alkaline earth metal salt etc. These may be used alone but two or more kinds can be used by mixture. Similarly, silicone rubbers can be blended as other drip inhibitors.

Silicone oil may be blended with the flame-retardant thermoplastic resin composition of the present invention in order to prevent secondary aggregation when blended and to improve water resistance. Silicone oil having methylpolysiloxane structure may consist of dimethylpolysiloxane structure alone, both dimethylpolysiloxane structure and methylhydrogenpolysiloxane structure, or methylhydrogenpolysiloxane structure alone. These silicone oils may be at least one kind of modified silicone oil selected from an epoxy-modified, carboxyl-modified, carbinol-modified and amino-modified silicone oil.

A specific example of silicone oil consisting of 100% methylhydrogen structure is KF-99 (manufactured by Shin-Etsu Chemical Co., Ltd.). Specific examples of silicone oil partially consisting of methylhydrogen structure are HMS-151 (manufactured by Gelest Inc.), HMS-071 (manufactured by Gelest Inc.), HMS-301 (manufactured by Gelest Inc.) and DMS-H21 (manufactured by Gelest Inc.). Examples of epoxy-modified products are X-22-2000 (manufactured by Shin-Etsu Chemical Co., Ltd.) and KF-102 (manufactured by Shin-Etsu Chemical Co., Ltd.). An example of a carboxyl-modified product is X-22-4015 (manufactured by Shin-Etsu Chemical Co., Ltd.). An example of a carbinol-modified product is X-22-4015 (manufactured by Shin-Etsu Chemical Co., Ltd.). An example of amino-modified product is KF-393 (manufactured by Shin-Etsu Chemical Co., Ltd.).

An ammonium polyphosphate compound may be added to the thermoplastic resin composition of the present invention, however, it is necessary to care the addition since the water resistance tends to decrease. The above ammonium polyphosphate compound is ammonium polyphosphate itself or a compound whose main component is ammonium polyphosphate. The ammonium polyphosphate is a compound represented by the general formula $(NH_4)_{r+2}P_rO_{3r+1}$ (r is an integer of 20~1,000). When r is sufficiently large, it is a compound approximated with a formula of metaphosphoric acid $(NH_4PO_3)_r$ (r is an integer of 20~1,000). Examples of store-bought products of the ammonium polyphosphate are Exolit-422 (Commercial name, manufactured by Clariant International Ltd.), Exolit-700 (Commercial name; manufactured by Clariant International Ltd.), Phos-chek-P/30 (Commercial name: manufactured by Monsant Company), Phos-chek-P/40 (Commercial name: manufactured by Monsant Company), SUMISAFE-P (Commercial name: manufactured by Sumitomo Chemical Co., Ltd.), TERRAJU-S10 (Trademark, manufactured by CHISSO CORPORATION), TERRAJU-S20 (Trademark, manufactured by CHISSO CORPORATION).

Compounds having the above ammonium polyphosphate as a main component are as follows: the one wherein the said ammonium polyphosphate is coated or microencapsulated with thermosetting resin, the one wherein the surface of said ammonium polyphosphate is coated with a melamine monomer or other nitrogen-containing organic compounds, the one treated with a surfactant or a silicone compound, or the one obtained by adding the melamines in the process of manufacturing ammonium polyphosphate to make the afore-mentioned compounds hardly soluble. Examples of store-bought products are Exolit-462 (Commercial name: manufactured by Clariant International Ltd.), Exolit AP-750 (Commercial name: manufactured by Clariant International Ltd.), SUMISAFE-PM (Commercial name: manufactured by Sumitomo Chemical Co., Ltd.), TERRAJU-C60 (Trademark: manufactured by CHISSO CORPORATION), TERRAJU-C70 (Trademark: manufactured by CHISSO CORPORATION), and TERRAJU-C80 (Trademark: manufactured by CHISSO CORPORATION).

Examples of the thermoplastic resin used for the present invention are α-olefin polymer such as polypropylene, high-density polyethylene, low-density polyethylene, straight chain low-density polyethylene, polybutene and poly-3-methyl pentene; polyolefin resin and its copolymer such as ethylene-vinyl acetate or ethylene-propylene copolymers; halogen-containing resins such as polyvinyl chloride, polyvinylidene chloride, chlorinated polyethylene, chlorinated polypropylene, polyvinylidene fluoride, chlorinated rubber, vinyl chloride-vinyl acetate copolymer, vinyl chloride-ethylene copolymer, vinyl chloride-vinylidene chloride copolymer, ternary copolymer of vinyl chloride-vinylidene chloride-vinyl acetate, vinyl chloride-acrylic ester copolymer, vinyl chloride-maleic ester copolymer and vinyl-chloride-cyclohexylmaleimide copolymer; petroleum resin; coumarone resin; polystyrene; polyvinyl acetate; acrylic resin; styrene and/or α-methylstyrene and other monomers (such as maleic anhydride, phenylmaleimide, methylmethacrylate, butadiene and acrylonitrile) (such as AS resin, ABS resin, MBS resin and heat resistant ABS resin); straight chain polyesters such as polymethylmethacrylate, polyvinylalcohol, poly(vinyl formal), polyvinyl butyral, polyethylene terephthalate and polybutylene terephthalate; polyphenylene oxide; polyamides such as polycaprolactam and polyhexamethylene adipamide; thermoplastic resins and these blends such as polycarbonate, polycarbonate/ABS resin, branched polycarbonate, polyacetal, polyphenylenesulfide, polyurethane and cellulosic resins. Elastomers such as isoprene rubber, butadiene rubber, acrylonitrile-butadiene copolymer rubber and stylene-butadiene copolymer rubber may also be used. The present invention is available for polyolefin resins among these thermoplastic resins, in particular polypropylene resins and polyethylene resins, which were difficult to make flame-retardant.

Depending on density, softening point, insoluble ratio against solvent, degree of stereo-regularity, existence or non-existence of residue of catalyst, types and blending ratio of olefin as a raw material and types of polymerization catalyst (such as Lewis acid catalyst, metallocene catalyst), the degree of the effect of the present invention differs, however, the present invention is available in all cases.

It is preferable that the flame-retardant thermoplastic resin composition of the present invention is stabilized by adding further additives such as phenolic antioxidants, phosphoric antioxidants, thioether antioxidants, ultraviolet absorbers, hindered amine light stabilizers etc., if necessary.

Examples of the above phenol antioxidant are 2,6-di-tert-butyl-p-cresol, 2,6-diphenyl-4-octadesiloxyphenol, distearyl (3,5-di-tert-butyl-4-hydroxybenzyl)phosphonate, 1,6-hexamethylenebis[(3,5-di-tert-butyl-4-hydroxyphenyl) propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-secondary-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocya nurate, 1,3,5-tris(3,5-di-tert-butyl-4-hydroxybenzyl) isocyanurate, 1,3,5-tris(3,5-di-tert-butyl-4-hydroxybenzyl)-2,4,6-trimeth ylbenzen, 2-tert-butyl-4-methyl-6-(2-acryloyloxy-3-tert-butyl5-methy lbenzyl)phenol, stearyl(3,5-di-tert-butyl-4-hydroxyphenyl) propionate, tetrakis[3-(3,5-di-tert-butyl-4-hydroxyphenyl) methylpropionate]methane, thiodiethyleneglycol-bis[(3,5-di-tert-butyl-4-hydroxyphenyl)propionate], 1,6-hexamethylene-bis[(3,5-di-tert-butyl-4-hydroxyphenyl)pr opionate], bis [3,3-bis(4-hydroxy-3-tert-butylphenyl)butylic acid] glycolester, bis[2-tert-butyl-4-methyl-6-(2-hydroxy-3-tert-butyl-5-methylbenzyl)phenyl]terephthalate, 1,3,5-tris[(3,5- di-tert-butyl-4-hydroxyphenyl) propionyloxyethyl] isocyanurate, 3,9-bis[1,1-dimethyl-2-{(3-tert-butyl-4-hydroxy-5-methylphenyl)propionyloxy}ethyl]-2,4,8,10-tetraoxaspiro[5,5]undecane, triethyleneglycol-bis[(3-tert-butyl-4-hydroxy-5-methylphenyl)propionate]. These may be used alone or two or more kinds may be used by mixture. It is preferable that the amount used is 0.001~10 mass parts, in particular 0.05~5 mass parts relative to 100 mass parts of thermoplastic resin.

Examples of the afore-mentioned phosphoric antioxidant are trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl) monophenyl phosphite, di(tridecyl)pentaerythritol diphosphite, di(nonylphenyl) pentaerythritol diphosphite, bis (2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra (tridecyl)isopropylidenediphenol diphosphite, tetra(tridecyl)-4,4'-n-butylidenebis(2-tert-butyl-5-methyl phenol) diphosphite, hexa(tridecyl)-1,1,3-tris(2-methyl-4-hydroxy-5-tert-butylphenyl)butane triphosphite, tetrakis(2,4-ditert-butylphenyl)biphenylene diphosphite, 9,10-dihydro-9-oxa-10-phosphaphenanthrene-10-oxide, 2,2'-methylenebis(4,6-tert-butylphenyl)-2-ethylhexyl-phosphite, 2,2'-methylenebis (4,6-tert-butylphenyl)-octadecylphosphite, 2,2'-ethylidenebis(4,6-di-tert-butylphenyl) fluorophosphite and phosphites of tris (2-[(2, 4, 8, 10-tetrakis-tert-butyldibenzo [d, f][1, 3, 2]dioxaphosphepine-6-yl)oxy]ethyl)amine, 2-ethyl-2-butylpropyleneglycol and 2, 4, 6-tri-tert-butylphenol. These may be used alone or two or more kinds may be used by mixture. It is preferable to use 0.001~10 mass parts, in particular 0.05~5 mass parts relative to 100 mass parts of thermoplastic resin.

Examples of the above thioether antioxidants are dialkyl thiodipropionates such as dilauryl thiodipropionate, dimylistyl thiodipropionate and distearyl thiodipropionate, and pentaerythritol tetra(β-alkyl mercapto propionic acid esters). These may be used alone or two or more kinds may be used by mixture. It is preferable to use 0.001~10 mass parts, in particular 0.05~5 mass parts relative to 100 mass parts of thermoplastic resin.

Examples of the afore-mentioned ultraviolet absorber are 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2'-hydroxyphenyl) benzotriazoles such as 2-(2'-hydroxy-5'-methylphenyl) benzotriazole, 2-(2'-hydroxy-3',5'-ditert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylenebis(4-tert-octyl-6-(benzotriazolyl)phenol) and 2-(2'-hydroxy-3'-tert-butyl-5'-carboxyphenyl) benzotriazole; benzoates such as phenyl salicylate, resorcinolmonobenzoate, 2,4-ditert-butylphenyl-3,5-ditert-butyl-4-hydroxybenzoate, 2,4-di-tert-amylphenyl-3,5-di-tert-butyl-4- hydroxybenzoate and hexadecyl-3,5-ditert-butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β, β-diphenylacrylate and methyl-2-cyano-3-methyl-3-(p-methoxyphenyl)acrylate; triaryl triazines such as 2-(2-hydroxy-4-octoxyphenyl)-4,6-bis(2,4 ditert-butylphenyl)-s-triazine, 2-(2-hydroxy-4-methoxyphenyl)-4,6-diphenyl-s-triazine and 2-(2-hydroxy-4-propoxy-5-methylphenyl)-4,6-bis (2,4-di-tert-butylphenyl)-s-triazine. These may be used alone or two or more kinds may be used by mixture. It is preferable to use 0.001~30 mass parts, in particular 0.05~10 mass parts relative to 100 mass parts of thermoplastic resin.

Examples of the afore-mentioned hindered amine light stabilizer are hindered amine compounds such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-tetramethyl-4-piperidyl)sebacate, bis(1-octoxy-2,2,6,6-tetramethyl-4-piperidyl)sebacate, tetrakis(2,2,6,6-tetramethyl-4-piperidyl)-1,2,3,4-butane-tetracarboxylate, tetrakis(1,2,2,6,6-pentamethyl-4-piperidyl)-1,2,3,4-butane-tetracarboxylate, bis(2,2,6,6-tetramethyl-4-piperidyl). di(tridecyl)-1,2,3,4-butane-tetracarboxylate, bis(1,2,2,6,6-pentamethyl-4-piperidyl). di(tridecyl)-1,2,3,4-butane-tetra-carboxylate, bis(1,2,2,4,4-pentamethyl-4-piperidyl)-2-butyl-2-(3,5-ditert-butyl-4-hydroxybenzyl) malonate, 1-(2-hydroxyethyl)-2,2,6,6-tetramethyl-4-piperidynol/diethyl succinate condensation polymers, 1,6-bis(2,2,6,6-tetramethyl-4-piperidylamino)hexane/2,4-dichloro-6-morpholino-s-triazine condensation polymers, 1,6-bis(2,2,6,6-tetramethyl-4-piperidylamino)hexane/2,4-dichloro-6-tert-octylamino-s-triazine condensation polymers, 1,5,8,12-tetrakis[2,4-bis(N-butyl-N-(2,2,6,6-tetramethyl-4-piperidyl) amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-yl] aminoundecane and 1,6,11-tris[2,4-bis(N-butyl-N-(1,2,2,6, 6-pentamethyl-4-piperidyl)amino)7s-triazine-6-yl] aminoundecane. These may be used alone or two or more kinds may be used by mixture. It is preferable to use 0.001~30 mass parts, in particular 0.05~10 mass parts relative to 100 mass parts of thermoplastic resin.

Nucleating agents such as p-tert-butyl aluminum benzoate, aromatic phosphoric acid ester metallic salt and dibenzylidene sorbitol; antistatic agent, metallic soap, hydrotalcite, triazine ring-containing compound, metallic hydroxide, phosphoric acid ester flame retardant, condensed phosphoric acid ester flame retardant, phosphate flame retardant, inorganic phosphorus flame retardant, halogenated flame retardant, silicone flame retardant, antimony oxide such as antimony trioxide, other inorganic flame-retardant auxiliary agents, other organic flame retardants, filler, pigment, lubricant and foaming agent may be added to the flame-retardant thermoplastic resin composition of the present invention, if necessary.

Examples of the above triazine ring-containing compound are melamine, ammeline, benzguanamine, acetoguanamine, phthalodiguanamine, melamine cyanurate, melamine pyrophosphate, butylenediguanamine, norbornenediguanamine, methylenediguanamine, ethylenedimelamine, trimethylenedimelamine, tetramethylenedimelamine, hexamethylenedimelamine and 1,3-hexylenedimelamine etc.

Examples of the above metal hydroxide are magnesium hydroxide, aluminum hydroxide, calcium hydroxide, barium hydroxide, zinc hydroxide and Kisuma 5A(commercial name of magnesium hydroxide: manufactured by Kyowa Chemical Industry Co., Ltd).

Examples of the above phosphoric acid ester flame retardant are trimethyl phosphate, triethyl phosphate, tributyl phosphate, tributoxyethyl phosphate, tris-(chloroethyl) phosphate, tris-(dichloropropyl) phosphate, triphenyl phosphate, tricresyl phosphate, cresyldiphenyl phosphate, trixylenyl phosphate, octyldiphenyl phosphate, xylenyldiphenyl phosphate, trisisopropylphenyl phosphate, 2-ethylhexyldiphenyl phosphate, t-butylphenyldiphenyl phosphate, bis-(t-butylphenyl)phenyl phosphate, tris-(t-butylphenyl)phosphate, isopropylphenyldiphenyl phosphate, bis-(isopropylphenyl) diphenylphosphate and tris-(isopropylphenyl) phosphate.

Examples of the above condensation phosphoric acid ester flame retardant are 1,3-phenylene bis(diphenyl phosphate), 1,3-phenylene bis(dixylenyl phosphate) and bisphenol A bis (diphenylphosphate).

Examples of the above other inorganic flame-retardant auxiliary agent are inorganic compounds such as titanium oxide, aluminum oxide, magnesium oxide, hydrotalcite, talc and montmorillonite, and their surface-treated products. Specific examples are various types of store-bought products such as TIPAQUE R-680 (titanium oxide: manufactured by ISHIHARA SANGYO, LTD.), Kyowa MAG 150(magnesium oxide: manufactured by Kyowa Chemical Industry Co., Ltd), DHT-4A(hydrotalcite: manufactured by Kyowa Chemical Industry Co., Ltd) and Alkamiser 4(zinc-modified hydrotalcite: manufactured by Kyowa Chemical Industry Co., Ltd).

The example of the above other organic flame-retardant auxiliary agent is pentaerithritol.

The flame-retardant thermoplastic resin composition of the present invention can further contain additives which are usually used for synthetic resin, such as cross linking agent, antistatic agent, tarnish inhibitor, plate-out inhibitor, surface treatment agent, plasticizer, lubricant, flame retardant, fluorescent agent, mildew agent, disinfectant, foaming agent, metal deactivator, mold-releasing agent, pigment, processing material, antioxidant and light stabilizer, to the extent that it does not interfere with the effects of the present invention.

The flame-retardant thermoplastic resin molded article of the present invention can be obtained easily by molding the flame-retardant thermoplastic resin composition of the present invention by well-known methods. The method of molding is not limited in particular. Molded products having various forms such as resin board, sheet, film and profile can be easily manufactured by suitably using extrusion process, calender process, injection molding, roll molding, compression molding and blow molding etc.

Since the flame-retardant thermoplastic resin composition of the present invention has excellent workability, the surface of the strand obtained by the extrusion-processing is flat and smooth, therefore, it has excellent surface quality. Furthermore, the flame-retardant thermoplastic resin composition and its molded article of the present invention can be widely used for the industrial fields such as electric. electronic. communication, Agriculture, Forestry and Fisheries, mining, construction, food, fiber, clothes, medical care, coal, petroleum, rubber, leather, automobile, precision instrument, lumber, building material, civil engineering, furniture, printing and musical instrument.

Examples of concrete uses of the flame-retardant thermoplastic resin composition and its molded article of the present invention are the uses for office automation instruments such as a printer, a personal computer, a word processor, a keyboard, a personal digital assistant equipment, a telephone equipment, a copy machine, a fax machine, an electronic cash register, a personal electronic calculator, an electronic organizer, a card, a holder and a writing material; electric household appliances and electrical equipments such as a laundry machine, a refrigerator, a vacuum cleaner, a microwave, a lighting equipment, a game machine, an iron and a kotatsu; audio video equipments such as a television, a video tape recorder, a video camera, a radio cassette player, a tape recorder, a mini disc, a CD player, a speaker and a liquid crystal display; electric. electrical parts and communication devices such as a connector, a relay, a condenser, a switch, a printed circuit board, a coil bobbin, a semiconductor sealing material, a LED sealing material, an electric wire, a cable, a transformer, a deflection yoke, a distribution switchboard and a clock.

The flame-retardant thermoplastic resin composition and its molded article of the present invention can further be widely used for automobile, vehicle, ship, airplane, building, housing and materials for building or civil engineering such as seat (stuffing, outer material and the like), belt, ceiling covering, convertible top, armrest, door trim, rear package tray, carpet, mat, sun visor, wheel cover, mattress cover, airbag, insulating material, strap, strap belt, wire coating material, electrical insulating material, paint, coating material, top layer material, floor material, corner wall material, carpet, wallpaper, wall covering material, facing material, interior material, roof material, deck material, wall material, pillar material, bottom board, fence material, frame and cope, window and door shape materials, shingle board, siding, terrace, balcony, soundproof board, thermal insulating board and window material; living goods and sporting goods such as clothing material, curtain, sheets, plywood, synthetic fiber board, rug, doormat, tarpaulin, bucket, hose, container, glasses, bag, case, snow goggle, ski, racket, tent and musical instrument.

The invention will now be explained in detail referring to examples, but the invention is not limited by these explanations. All of the compositions shown in Table 1 are based on mass parts.

EXAMPLES 1~6 AND COMPARATIVE EXAMPLES 1~4

0.1 mass parts of calcium stearate (lubricant), 0.1 mass parts of tetrakis [3-(3, 5-ditert-butyl-4-hydroxyphenyl) methyl propionate] methane (phenol antioxidant), 0.1 mass parts of tris (2, 4-di-tert-butylphenyl) phosphite (phosphorus antioxidant) and 0.3 mass parts of glycerin monostearate (lubricant) were added to 30 mass parts of low-density polyethylene (PES-120; manufactured by Nippon Unicar Company Limited) and 30 mass parts of ethylene-vinyl acetate copolymer (Ultrathene 635, manufactured by Tosoh Corporation) to obtain thermoplastic resin composition. The obtained thermoplastic resin composition was mixed with the component described in the following Table 1 to manufacture pellet extruded under the following processing conditions. The pellet was injection-molded at 190° C. to obtain 1.6 mm×12.7 mm×127 mm of test pieces for flame-retardant test and water resistant test.

Furthermore, tests of workability, water resistance and flame retardancy were carried out under the following conditions. The results are shown in Table 1.

<Test of Workability>

The evaluation of workability was carried out by the following criteria wherein the surface of the strand was identified visually when extrusion-processed under the following condition.

1. Workability Test Condition.

Extrusion machine; LABO PLASTOMILL extrusion machine (manufactured by Toyo Seiki Seisaku-sho, Ltd.)
 Temperature: 190° C.
 Screw: conical (two axes)
 Rotation number: 75 rpm
 Dice: 1 mm×19 mm
 Feed: 70~85 g/min 2. Evaluation of Workability o: The surface of the strand is smooth and excellent in flatness and smoothness.

Δ: The surface of the strand is slightly irregular.

X: The surface of the strand is irregular, which is neither smooth nor flat.

<Water Resistant Test>

1.6 mm×12.7 mm×127 mm of water resistant test piece was soaked in hot water at 70° C. After the test piece was taken out from the hot water to dry, its weight was measured to obtain a dissolution amount in hot water from the difference between weights of soaking before and after.

The dissolution amount was represented with the amount dissolved from the test piece, which was expressed by percentage.

<Flame Retardancy UL-94V Test Method>

After 127 mm long×12.7 mm wide×1.6 mm thick of the test piece was hold vertically to contact its bottom end with fire of burner closely for 10 seconds, the burner was removed to measure the time until the fire of the test piece goes out. As soon as the fire went out, the second close of fire was carried out for 10 seconds to measure the time until the fire goes out in the same way as the first time. Furthermore, whether the cotton of the lower part of the test piece is fired or not with dropping live charcoal was evaluated simultaneously.

Based on the first and second burning time and whether the cotton was fired or not, the burning degree was ranked according to UL-94V standard. V-0 was ranked as the top level of burning. As the number increases like V-0, V-1 and V-2, the flame retardancy gets lower. NR was the one that did not correspond to any of V-0~V-2.

The components (A) and (B) described in Table 1 were manufactured by the following methods.

MANUFACTURING EXAMPLE 1

Component (A): melamine pyrophosphate
Manufactured by reacting pyrophosphoric acid with melamine at the ratio of 1:1.

MANUFACTURING EXAMPLE 2

Component (B): piperazine pyrophosphate
Manufactured by reacting pyrophosphoric acid with piperazine at the ratio of 1:1.

CARBODILITE HMV-8CA or CARBODILITE LA-1 manufactured by Nisshinbo Holdings Inc. was used as polycarbodiimide of the component (C) described in Table 1.

Examples 1~6 of the present invention achieved the top rank of V-0 in the UL-94V test and also had excellent water resistance and workability. On the contrary, though Comparative examples 1 and 2 achieved the top rank of V-0 in the UL-94V test, water resistance and workability were poor. Comparative examples 3 and 4, wherein an ammonium polyphosphorate compound was used, did not show sufficient flame retardancy since it could not achieve the top rank of V-0 in the UL-94V test. Furthermore, water resistance and workability were poor, in particular it was identified that the water resistance was extremely poor.

Industrial Availability

Since the flame-retardant thermoplastic resin composition of the present invention has excellent flame retardancy, water resistance and excellent workability and molding properties, it is available for manufacturing molded articles such as electric wires, automobile interior materials, building materials and electric parts.

What is claimed is:

1. A flame-retardant thermoplastic resin composition comprising components (A), (B), and (C) mixed with at least one thermoplastic resin selected from the group consisting of polypropylene, high-density polyethylene, low-density polyethylene, straight chain low-density polyethylene, polybutene, poly-3-methylpentene, ethylene-vinyl acetate copolymer and ethylene-propylene copolymer:

wherein
component (A) is 0.1-40 mass parts of melamine polyphosphate compound represented by formula (1);
component (B) is 0.1-50 mass parts of piperazine polyphosphate compound represented by formula (3); and
component (C) is 0.01-10 mass parts of a polycarbodiimide,
respectively, relative to 100 mass parts of the thermoplastic resin;

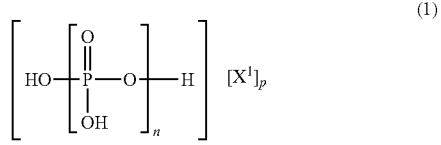

(1)

TABLE 1

|  | Example | | | | | | Comparative example | | | |
|---|---|---|---|---|---|---|---|---|---|---|
| Composition | 1 | 2 | 3 | 4 | 5 | 6 | 1 | 2 | 3 | 4 |
| Thermoplastic resin composition | 60.6 | 60.6 | 60.6 | 60.6 | 60.6 | 60.6 | 60.6 | 60.6 | 60.6 | 60.6 |
| Component (A) pyrophosphoric acid melamine | 16 | 16 | 15.2 | 15.2 | 16 | 16 | 16 | 15.2 |  | 16 |
| Component (B) piperazine phyrophosphate | 24 | 24 | 22.8 | 22.8 | 24 | 24 | 24 | 22.8 | 24 |  |
| Component (C) LA-1 | 1.0 |  | 1.0 |  | 0.3 | 1.8 |  |  | 1.0 |  |
| HMV-8CA |  | 1.0 |  | 1.0 |  |  |  |  |  | 1.0 |
| Component (D) zinc oxide ammonium polyphosphate compound*1 |  |  | 2.0 | 2.0 |  |  |  | 2.0 | 16 | 24 |
| Workability | ○ | ○ | ○ | ○ | ○ | ○ | X | X | X | X |
| Water resistance (%) | 0.28 | 0.32 | 0.28 | 0.32 | 0.36 | 0.27 | 0.8 | 0.8 | 3.2 | 3.8 |
| Flame-retardance UL-94V (1.6 mm) | V-0 | V-0 | V-0 | V-0 | V-0 | V-0 | V-0 | V-0 | V-2 | V-2 |

*1Ammonium polyphosphate compound Exolit AP-750 manufactured by Clariant International Ltd.

wherein
n is a number 2~100,
$X^1$ is melamine,
P is a number satisfying a relational formula $0<P\leqq n+2$;

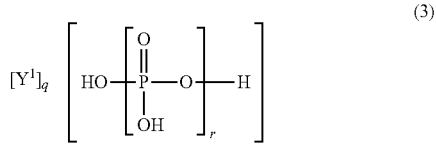

wherein
r is a number of 2~100,
$Y^1$ is piperazine, and
q is a number satisfying a relational formula $0<q\leqq r+2$.

2. A flame-retardant thermoplastic resin composition according to claim 1, further comprising zinc oxide as component (D).

3. A flame-retardant thermoplastic resin composition according to claim 1, wherein a melamine pyrophosphate is component (A), which is of formula (1), wherein n is 2, and p is 2.

4. A flame-retardant thermoplastic resin composition according to claim 1, wherein a piperazine polyphosphate is component (B), which is of formula (3), wherein r is 2 and q is 1.

5. A flame-retardant thermoplastic resin composition according to claim 4, wherein the piperazine polyphosphate is a piperazine pyrophosphate.

6. A molded article, which has been prepared from flame-retardant thermoplastic resin composition according to claim 1.

7. A flame-retardant thermoplastic resin composition according to claim 1, wherein the thermoplastic resin is selected from the group consisting of polypropylene, high density polyethylene, low-density polyethylene, straight chain low-density polyethylene, polybutene, and poly-3-methylpentene.

8. A flame-retardant thermoplastic resin composition according to claim 7, further comprising zinc oxide as component (D).

9. A flame-retardant thermoplastic resin composition according to claim 7, wherein a melamine pyrophosphate is component (A), which is of formula (1), wherein n is 2, and p is 2.

10. A flame-retardant thermoplastic resin composition according to claim 7, wherein a piperazine polyphosphate is component (B), which is of formula (3), wherein r is 2 and q is 1.

11. A flame-retardant thermoplastic resin composition according to claim 10, wherein the piperazine polyphosphate is a piperazine pyrophosphate.

12. A molded article, which has been prepared from flame-retardant thermoplastic resin composition according to claim 7.

13. A flame-retardant thermoplastic resin composition according to claim 1, wherein the blending ratio of (A)/(B) (mass standard) is 20/80-50/50.

14. A flame-retardant thermoplastic resin composition according to claim 7, wherein the blending ratio of (A)/(B) (mass standard) is 20/80-50/50.

15. A flame-retardant thermoplastic resin composition according to claim 1, consisting essentially of components (A), (B), and (C) mixed with at least one thermoplastic resin.

16. A flame-retardant thermoplastic resin composition according to claim 7, consisting essentially of components (A), (B), and (C) mixed with at least one thermoplastic resin.

* * * * *